(No Model.) 3 Sheets—Sheet 1.
B. J. EDWARDS.
PHOTOGRAPHIC CAMERA.
No. 452,119. Patented May 12, 1891.
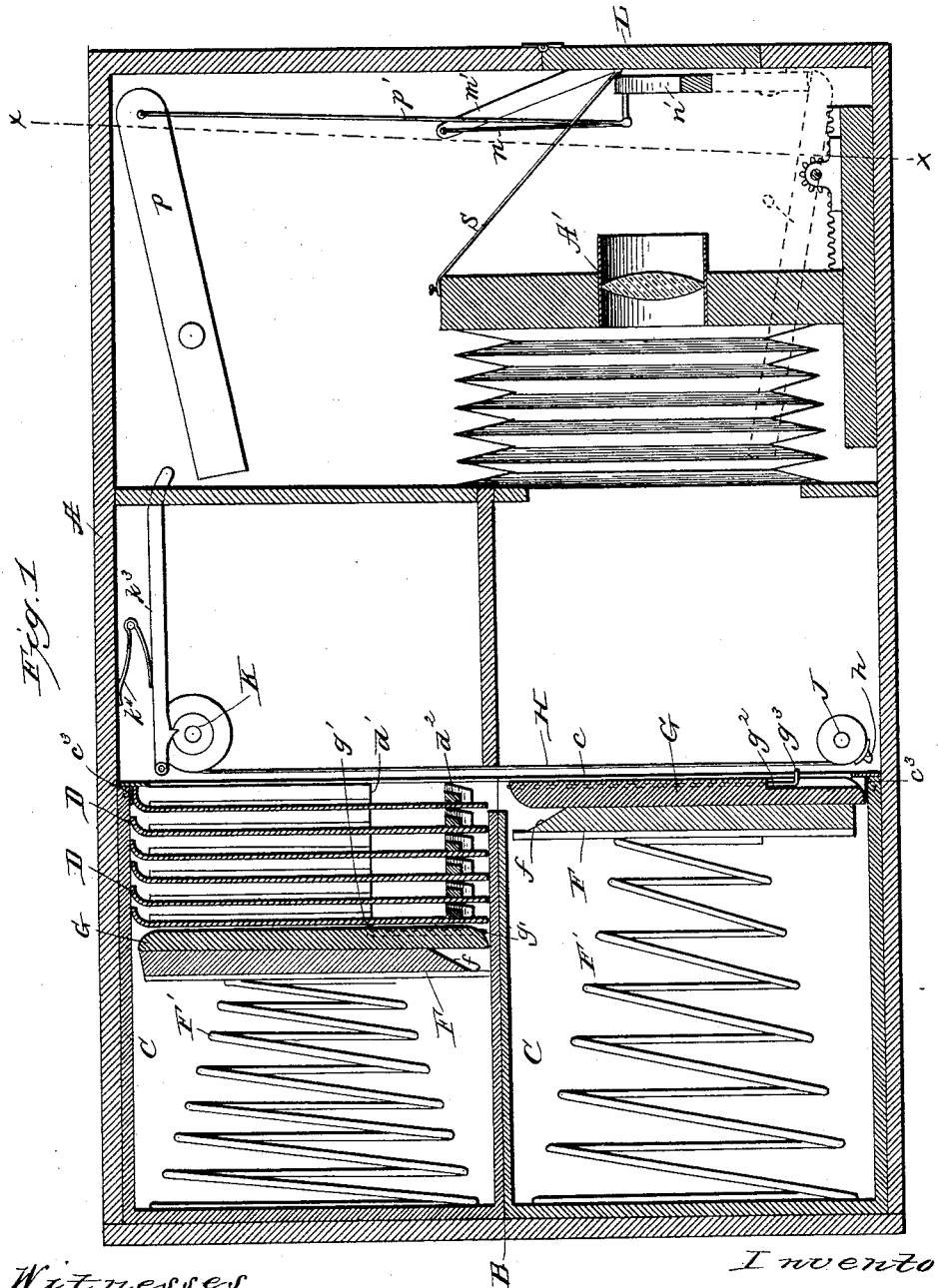
Witnesses.
Abran Macauley
E. D. Smith
Inventor
Benjamin J. Edwards (No Model.) B. J. EDWARDS. 3 Sheets—Sheet 2.
PHOTOGRAPHIC CAMERA.
No. 452,119. Patented May 12, 1891.
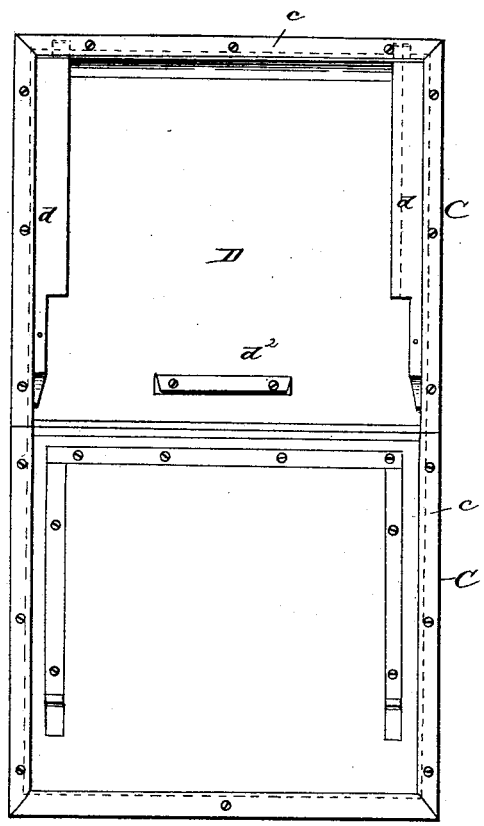
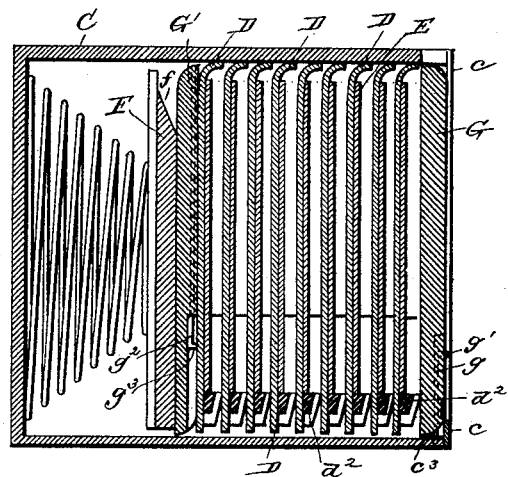
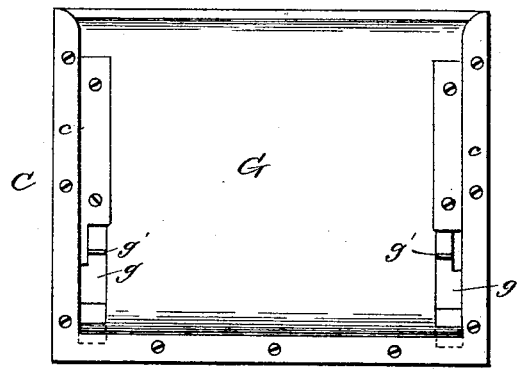
WITNESSES: INVENTOR,
Alvan Macauley Benjamin J. Edwards
E. D. Smith (No Model.) 3 Sheets—Sheet 3.

B. J. EDWARDS.
PHOTOGRAPHIC CAMERA.

No. 452,119. Patented May 12, 1891.

WITNESSES:
Alvan Macauley.
E. D. Smith

INVENTOR,
Benjamin J. Edwards

UNITED STATES PATENT OFFICE.

BENJAMIN J. EDWARDS, OF LONDON, ENGLAND.

PHOTOGRAPHIC CAMERA.

SPECIFICATION forming part of Letters Patent No. 452,119, dated May 12, 1891.

Original application filed June 26, 1890, Serial No. 356,826. Divided and this application filed September 25, 1890. Serial No. 366,133. (No model.) Patented in England July 16, 1889, No. 11,416.

*To all whom it may concern:*

Be it known that I, BENJAMIN J. EDWARDS, a subject of the Queen of Great Britain, of the Grove, Hackney, London, in the county of Middlesex, England, have invented certain new and useful Improvements in Photographic Cameras, (for which British Letters Patent No. 11,416, dated July 16, 1889, were granted me;) and I do hereby declare the following to be a full, clear, and exact description of the same, reference being had to the accompanying drawings, forming a part of this specification, and to the figures and letters marked thereon.

The invention forming the subject-matter of this application, which is a division of my prior application, Serial No. 356,826, filed June 26, 1890, relates to cameras in which are used dry plates or cut sheets of film, constituting separate sensitized surfaces as distinguished from continuous surfaces or films in lengths sufficient for two or more exposures; and it has for its objects to provide means for readily transferring the plates from one receptacle to the other, and at the same time setting the shutter, which when released causes the exposure of said plates.

The herein-described invention consists in certain novelties of construction and combinations of parts, all as will be hereinafter fully described, and the novel features pointed out in the claims at the end of this specification.

Figure 8:
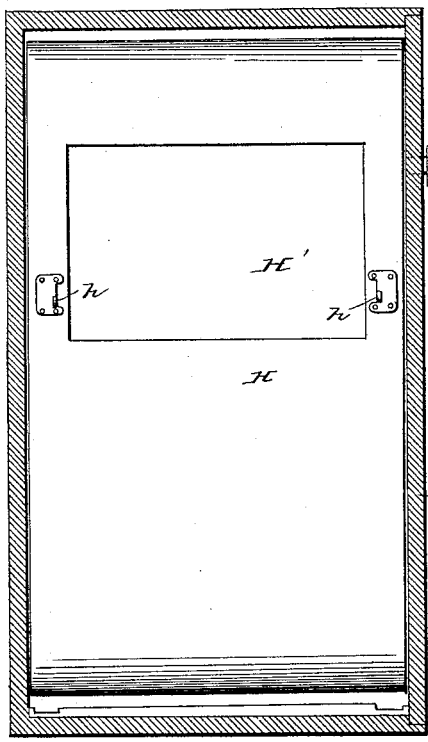
Figure 5:
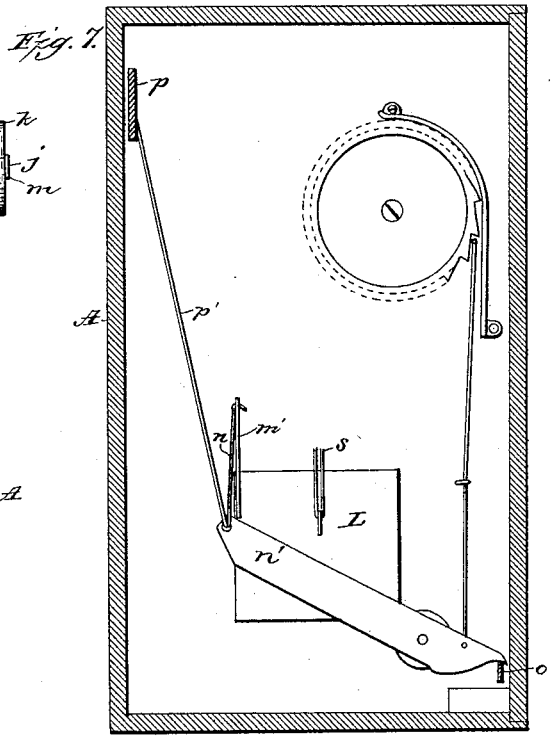
Figure 10:
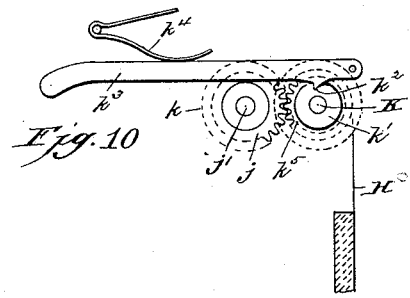
Figure 9:

In the drawings, Figure 1 is a longitudinal sectional view of a portion of a camera constructed in accordance with my invention; Fig. 2, a front view of two of the plate-holding receptacles or boxes; Fig. 3, a section, and Fig. 4 a front view, of a full box of plates; Fig. 5 a front and Fig. 6 a vertical sectional view of one of the plate-holders; Fig. 7, a sectional view showing the cover, shutter, and operating devices, taken on the line $x\ x$ of Fig. 1; Fig. 8, a rear and Fig. 9 a side view of the blind-shutter. Fig. 10 is a side view of the gearing for moving the shutter and the detent.

Similar letters of reference in the several figures denote similar parts.

In carrying out my invention I provide a suitable camera casing or receptacle A, having an adjustable lens A′, preferably adjustable for focusing, and a roller blind-shutter H, and in rear of this a chamber B, in which the interchangeable boxes or receptacles C C for containing the exposed and unexposed plates are located. The plate-boxes C C are removable and interchangeable, and are placed in the chamber B either side by side or above one another, as in Fig. 1, and the fronts of the boxes are provided on three sides with flanges $c$, the fourth side being left open, the flanges on the two boxes when their open sides abut forming ways through which the plate sheaths or holders pass from the front of one box to the other.

Figure 6:
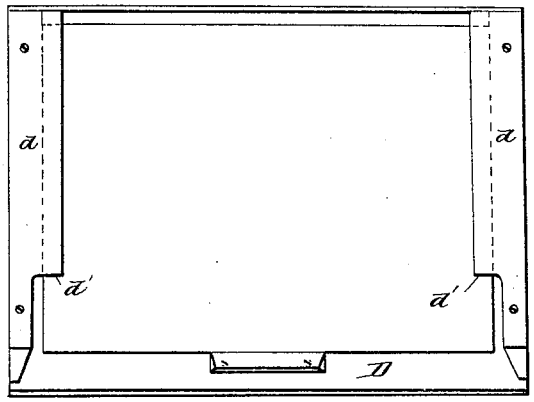

The sheaths or plate-holders D are constructed, preferably, as in Figs. 5 and 6, being made of vulcanite, wood, or other suitable material, having projecting flanges $d$ at the sides, forming grooves for receiving the plate, said flanges being cut away at the lower portion, forming shoulders $d'$, and at their lower ends they are beveled or cut away at the forward side, as shown. Just above the lower end is provided a retaining-shoulder or stop $d^2$, and when the plate E is slid into the sheath the curved upper end of the latter forms a stop for it, while the springy nature of the vulcanite, if this is employed, will permit the lower end to clear the stop, which latter, after the plate is in position, will engage the lower end of the plate and prevent accidental removal.

In each of the boxes C is provided a movable follower F, keeping the plate-holders pressed against the flanges at the sides of the open end by means of a spring F′, the end of said follower being beveled or cut away at $f$.

In addition to the plate sheaths or holders I provide two loose covering boards or partitions G G′, which, when the plate-holders are in one box, as in Fig. 3 in the drawings, are located one G′ next the follower F and the other G at the forward or open end of said box.

The front edges of the covering board or plate G are slightly beveled, as shown, and in its lower portion, near the sides, are provided two catches or bolts $g$, sliding in suitable grooves or recesses in the plate, the operating portions $g'$ of said catches projecting on the face, as in Fig. 4, and when said board covers the plate-holders in the box the catches are projected and engaged with recesses in the lower edge of the box, as in Fig. 3, while the straight edge is in engagement with the upper edge of the box.

The board G' at the back of the series of plate-holders is provided with the beveled rear edge at the top and the beveled forward edge at the bottom, and in it are arranged two sliding bolts or catches $g^2$, adapted to be projected at the upper end, (the operating ends $g^3$,) said bolts projected from the front side in a position corresponding to that of the bolts in board G.

The front ends of the boxes C are provided with small stop-strips $c^3$, against which the ends of the boards G G' abut when at the open end of the box, as in Fig. 1, thereby preventing the lower edge of the covering-board passing inside the box. It will be seen that when the boxes are in the position in Fig. 1 the sheaths or holders can be moved from the lower to the upper box, each succeeding one co-operating with the lower end of the preceding one and pressing the others back against the tension of the follower-spring, as will be understood, the follower in the box from which it is removed pressing the next one forward.

In front of the open mouths of the boxes is arranged a roller blind or flexible shutter, consisting, essentially, of a piece of flexible material H, provided with an exposing-opening H' and connected at opposite ends to rollers J and K, the former containing a spring which tends to wind the shutter on the roller, while the other roller K is provided with gear $k^5$, in mesh with another gear $j$ on a shaft $j'$, having a milled head $k$, projecting to the exterior of the casing for the purpose of enabling the shutter to be wound on the roller against the tension of the spring, and a wheel or disk $k'$ is also provided on the shaft, having a notch or projection $k^2$, with which co-operates a catch $k^3$, thrown into engagement by a spring $k^4$. The edges of the shutter are provided with small beveled catches or lugs $h$, and as the shutter is located in front of the boxes C the catches are arranged, when the shutter is moved in a direction to wind it up on roller K, to engage with the shoulders $d'$ on the first plate holder or sheath in the lower box, which we will assume has been exposed, and lift the plate from the lower to the upper compartment, permitting the next succeeding one to move forward into position to be exposed and to be transferred after exposure in the same manner. The upper roller K is so positioned relative to the shoulders on the plate-holders and the catches on the shutter that when the latter is fully wound up the plate-holders will just be in position within the upper box, as shown in Fig. 1, and retained from falling by the pressure of the follower and preceding plates caused by the spring. The exposure of the plate is caused by releasing the catch $k^3$ and allowing the spring in roller J to draw the shutter rapidly down, causing its aperture H' in passing the plate to admit the light passing through the lens to it, as will be readily understood.

In order to provide means for covering the plate while the shutter-aperture is passing by it during the operation of setting the shutter, and also to cause the simultaneous removal of the covering device and the release of the blind-shutter, I provide a flap-shutter L, formed of any suitable material and located in any position desired relative to the lens, said shutter being closed by a spring S. On this shutter is an arm $m'$, connected by a link $n$ with one end of a lever $n'$, operated by another lever $o$, projecting to the exterior of the casing. Pivoted in the casing is a lever $p$, arranged to co-operate with the catch $k^3$ at one end while its other is connected by a link $p'$ with the end of lever $n'$, so that when the projecting end of the lever $o$ is pressed down the catch $k^3$ through the mechanism described will be released and the shutter H allowed to fall and make the exposure.

R is a wheel in the casing having numbers in its periphery visible through an opening in a plate R', and actuated by a sliding spring-rod $R^2$, connected to lever $n'$, and co-operating with a ratchet $R^3$ on said wheel for counting the exposures.

When the boxes C are placed in the camera, the one filled with plates, as shown in Fig. 3, occupying the lower position in the present construction, has the two covering-boards G G' in it, one at each end of the series of plate-holders. The board G at the front will have its bolts $g$ engaged with the notches $g'$, hereby preventing the cover from being moved inward and fogging the plate, and the board G' at the rear will be next the follower F, with its bolts toward the top. The first movement of the shutter will, as described, first strike the projection $g'$ and disengage the bolts $g$, and then raise the board into the upper box. The release of the shutter will cause the exposure of the first plate in the plate-holder at the front of the lower box, and the subsequent plate-holders will be raised successively by each succeeding resetting of the shutter, as described, the beveled portions of said plate-holders pressing the preceding holders back until the last board G' is reached, when the catches on the shutter engaging the bolts $g^2$ will raise the board G' and project the bolts into the recesses in the top of the upper box C, the lower straight edge of said board engaging the open side of the box, thereby locking said cover and preventing its accidental inward movement and the consequent fogging of the contained plates. The boxes C may now be removed in the light without danger of fogging the plates, and the empty (lower) box may be moved into the place formerly occupied by the one removed full, and a similar box or magazine containing unexposed plates and properly protected by covering-boards inserted in its place.

It will be seen that the only operations necessary to cause the removal of the exposed and proper positioning of the unexposed plates and the exposure of the latter in a camera of this description are, first, the manipulation of the milled head or handle $k$, causing the transfer of the plate and the setting of the shutter, and, second, the operation of the shutter L. The shutter L may, if desired, be operated by a button or lever or any other suitable device for the purpose. Any other suitable oscillating or drop shutter may be employed as a substitute for the shutter L, if desired.

For the purpose of enabling time exposures to be made with this shutter mechanism I arrange the milled head $k$ loosely on the shaft $j$, movable back and forth on a thread formed thereon and adapted, when moved in a direction to cause the setting of the shutter, to abut against a nut or abutment $m$ on the end of said shaft, so as to cause the latter to turn; but when turned in the other direction said head will abut against the side of the casing and hold the roller from movement. When desired to make a time exposure, the head is turned and the shutter wound on roller K until the aperture H' is in line with the lens, (this being determined by the number of clicks made by the catch $k^3$ dropping over the projection $k^2$.) Now head $k$ is screwed up against the casing and the shutter held from movement. Then the shutter L is raised, when the exposure can be made in the usual manner. After the exposure the head $k$ may be turned outward again and the shutter wound up to move the exposed plate into the upper box.

It is obvious that various modifications of construction can be employed without departing from the spirit of my invention, and I therefore do not desire to be confined to precisely the details herein shown.

I hereby disclaim the construction of the shutter herein shown, and also disclaim, broadly, devices for moving a sensitized surface other than separate glass plates or single sheets of film combined with an exposing-shutter so arranged that the sensitized surface is moved and the shutter set simultaneously.

I claim as my invention—

1. In a photographic camera, the combination, with the casing having compartments, of two removable and interchangeable plate-holding boxes having light-tight covers fitting the compartment within the casing, one of the boxes being arranged opposite the lens in another compartment, so that the plates in said box are exposed and then transferred to the other box, a transferring device for transferring the plates and the light-tight cover of one box to the other, substantially as described.

2. In a photographic camera, the combination, with the casing, of two removable plate-holding boxes, a roller shutter provided with lugs, and plate-holders having shoulders adapted to be engaged by said lugs, substantially as described.

3. The combination, with a receptacle for containing photographic-plate holders and a series of plate-holders adapted to be removed from said receptacle, of a photographic exposing-shutter, means for moving the shutter, and devices connected to the shutter for effecting the removal of the plate-holders and the plate by the movement of the shutter, substantially as described.

4. The combination, with a receptacle and a series of plate-holders contained therein, of a photographic exposing-shutter, a catch for retaining the same when set, and catches actuated by the movement of the shutter for removing one plate-holder from the receptacle, substantially as described.

5. The combination, with a receptacle and a series of plate-holders contained therein, of a photographic exposing-shutter having catches thereon arranged to engage and remove a plate-holder when the shutter is moved in one direction, substantially as described.

6. The combination, with an open-ended plate-holding box, of a spring-pressed follower, flanges at the sides of the front, an opening at the top at the ends of the flanges, and a covering board or partition, substantially as set forth.

7. The combination, with an open-ended plate-holding box having a spring-pressed follower, the flanges at the sides of the front, and the opening at the top at the end of the flanges, of the covering board or partition having the locking bolt or catch engaging the said box, substantially as described.

8. The combination, with two interchangeable open-ended plate-holding boxes, each having flanges on three sides of the end, and the spring-pressed follower, of a series of plate-holders having the beveled ends and a transferring device for moving said holders from one box to the other, substantially as described.

9. The combination, with two interchangeable open-ended plate-holding boxes, each having flanges on three sides of the ends, and the spring-pressed follower, of a series of plate-holders, a covering-board arranged next the follower, and a transferring device for moving the holders and the covering-board from one box to the other, substantially as described.

10. The open-ended plate-holding box having flanges on three sides of the ends and the spring-pressed follower, a series of plate-holders, and two covering-boards arranged in front and rear of the plate-holders, in combination with a receiver for the plate-holders, and a transferring device for removing the holders and covering-boards from the box into the receiver and covering the same, substantially as described.

11. The combination, with two open-ended plate-holding boxes communicating by an opening between them, of a series of plate-holders, covering-boards arranged at each end of the plate-holders, and a transferring device for removing the plate-holders from one box to the other, whereby the plates will be covered both in the containing and receiving boxes, substantially as described.

12. The combination, with the two open-ended plate-holding boxes communicating by an opening between them, of a series of plate-holders, covering-boards at the ends of the series, having catches or bolts therein, and a transferring device for removing the holders and covers from one receptacle to the other, adapted to engage the bolts and cause the unlocking of the bolt in the first cover and the locking of the bolt in the last cover when transferred, substantially as described.

13. The combination, with interchangeable boxes for containing plate-holders communicating by an opening between them, of a series of plate-holders having projections thereon, covering-boards having sliding bolts arranged in reversed positions at the ends of the same with their operating portion corresponding to the position of the projections on the holders, and a transferring device for engaging the holders and the bolts on the covers and transferring them one at a time from one box to the other, whereby the first board is unbolted, the plates transferred, and the last board bolted, substantially as and for the purpose set forth.

14. The herein-described plate-holder having the flanges at the top and sides, the shoulders or abutments on its edges, and the open bottom having the yielding projection for holding the plate in position, substantially as described.

15. The herein-described plate holders or sheaths having the flanges at the top and sides, the elastic lower portion, and the projection thereon for engaging the lower end of the plate and holding it in position, substantially as described.

16. The combination, with the open-ended plate-holding box and a series of plate-holders contained therein, of a flexible roller blind-shutter having an exposing-aperture and catches or projections thereon for engaging the holders when moved in one direction, a spring or motor device for operating the shutter in a direction to cause the exposure and a catch for retaining said shutter when set, substantially as described.

17. The combination, with the open-ended plate-holding box and a series of plate-holders contained therein, of a flexible roller blind-shutter having an exposure-aperture and catches or projections thereon for engaging the holders when moved in one direction, a motor device, such as a spring, for operating the shutter in a direction to cause the exposure, a catch for retaining said shutter when set, and a cover-shutter operating to cover the plate during the setting of the roller blind-shutter, substantially as described.

BENJAMIN J. EDWARDS.

Witnesses:
   FRED F. CHURCH,
   A. A. DAVIS.